United States Patent
Lecuyer

(10) Patent No.: US 7,099,696 B2
(45) Date of Patent: Aug. 29, 2006

(54) ANGLE DIVERSITY DUAL ANTENNA SYSTEM

(75) Inventor: Frederic Lecuyer, New Haven, CT (US)

(73) Assignee: Radio Frequency Systems, Inc., Meriden, CT (US)

( * ) Notice: Subject to any disclaimer, the term of this patent is extended or adjusted under 35 U.S.C. 154(b) by 522 days.

(21) Appl. No.: 10/366,397

(22) Filed: Feb. 14, 2003

(65) Prior Publication Data

US 2004/0160362 A1    Aug. 19, 2004

(51) Int. Cl.
*H04B 1/38* (2006.01)
*H04M 1/00* (2006.01)

(52) U.S. Cl. ............. 455/562.1; 455/101; 455/273

(58) Field of Classification Search ........ 455/101, 455/103, 132–135, 137–139, 272–273, 275, 455/276.1, 277.1, 277.2, 562.1, 561, 7; 375/347
See application file for complete search history.

(56) References Cited

U.S. PATENT DOCUMENTS

| | | | |
|---|---|---|---|
| 3,864,633 A * | 2/1975 | Strenglein | 455/134 |
| 4,129,874 A | 12/1978 | Bentley et al. | |
| 4,316,192 A | 2/1982 | Acoraci | |
| 4,564,935 A * | 1/1986 | Kaplan | 370/339 |
| 4,611,212 A | 9/1986 | Lee | |
| 4,914,443 A * | 4/1990 | Gans et al. | 342/361 |
| 5,202,700 A | 4/1993 | Miller | |
| 5,754,140 A * | 5/1998 | Starr et al. | 342/424 |
| 5,784,032 A | 7/1998 | Johnston et al. | |
| 5,880,701 A | 3/1999 | Bhame et al. | |
| 5,940,044 A | 8/1999 | Smith | |
| 5,966,102 A | 10/1999 | Runyon | |
| 5,969,689 A | 10/1999 | Martek et al. | |
| 6,150,975 A | 11/2000 | Pourailly et al. | |
| 6,356,242 B1 | 3/2002 | Ploussios | |
| 6,404,385 B1 | 6/2002 | Croq et al. | |

FOREIGN PATENT DOCUMENTS

EP    1279234 A    1/2003

* cited by examiner

*Primary Examiner*—Nguyen T. Vo
(74) *Attorney, Agent, or Firm*—Sughrue Mion; Thomas C. Gellenthien; V. Lawerence Sewell

(57) ABSTRACT

An angle diversity antenna system utilizes a first antenna, a second antenna, and a panel combiner coupled to the first and second antenna. In a transmit mode, the first and second antenna are coupled to a transmit sum channel of the panel combiner. In a receive mode, either the sum channel or a difference channel of the panel combiner is chosen as the active channel. By monitoring the sum channel and difference channel, the antenna system according to the present invention is able to select the channel which supplies the greatest signal strength.

15 Claims, 5 Drawing Sheets

ANGLE DIVERSITY DUAL ANTENNA SYSTEM

BACKGROUND OF THE INVENTION

1. Field of the Invention

The present invention relates to an antenna system utilized in line of sight communication links. More particularly, the present invention relates to a reduced size angle diversity antenna system used in line of sight communication links providing reduced windloading effects.

2. Related Art

In a line-of-sight communication system, long-distance terrestrial transmission of messages is accomplished via a series of relay points known as "hops." Each hop consists of a tower and corresponding antenna, wherein a signal travels from one tower to a next tower, the signal being amplified before traveling between towers. The transmission is described as "line of sight", and therefore, the antennas on a first tower must be visible from the antenna on the other tower.

Line-of-sight systems typically utilize antennas having large parabolic reflectors. In a receive mode, the parabolic reflector acts to collect a large area of a wavefront, and then focus the energy received in the wave back at the feed located at the antenna focal point. In a transmit mode, the reflector acts to accept radiated energy from the feedpoint and reflect the energy outward. The feed is known as a "microwave feedhorn" and is the part of the antenna that is held out in front the parabolic reflector.

The Federal Communications Commission (FCC) publishes technical standards for antennas operating in the transmit mode. These standards refer to each transmitting antenna licensed as a station on either end of a microwave point-to-point path. Category A standards apply to all stations operating in areas where certain microwave frequency bands are congested, or where there is a predictable risk of interference to other stations.

Large parabolic dish antennas provide adequate gain and directivity necessary to meet FCC Category A requirements but are burdened with complex structural problems. The manufacturing costs for feed structures of the parabolic antennas are quite high and the large physical structure of the parabolic antennas subjects the structure to very high wind loads.

For example, in a frequency range between 5.925 GHz and 6.425 GHz, a parabolic dish antenna having a diameter of approximately six feet is required to meet the FCC Category A requirements. An antenna of this size represents an area of over 28 square feet for wind load.

Signal fading is another known problem associated with the use of parabolic dish antennas. Fading occurs due to atmospheric conditions that cause bending of the signal path. This bending of the signal path makes the antenna to appear to be misaligned in the vertical direction.

Therefore, what is needed is a reduced sized line of sight antenna system that reduces the problems associated with parabolic dish antennas while maintaining the ability to meet FCC Category A requirements.

SUMMARY OF THE INVENTION

An innovative angle diversity antenna system utilizes a first antenna, a second antenna, and a panel combiner coupled to the first and second antenna. In a transmit mode, the first and second antenna are coupled to a transmit sum channel of the panel combiner. In a receive mode, the sum channel of the panel combiner and the difference channel of the panel combiner are connected to a receiver. The receiver selects the channel which supplies the greatest signal strength.

Angle diversity is utilized in the receive mode to reduce the effects of signal fading and a low profile structure for the first and second antennas acts to reduce problems associated with windloading. Thus, with proper spacing between the first and second antennas operating via the sum channel in a transmit mode, and choice of sum channel or difference channel in the receive mode, a reduced size antenna system is provided which is able to meet the FCC Category A requirements.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which.

DETAILED DESCRIPTION OF THE INVENTION

The following description of illustrative non-limiting embodiments of the invention discloses specific configurations, features, and operations. However, the embodiments are merely examples of the present invention, and thus, the specific features described below are merely used to more easily describe such embodiments and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
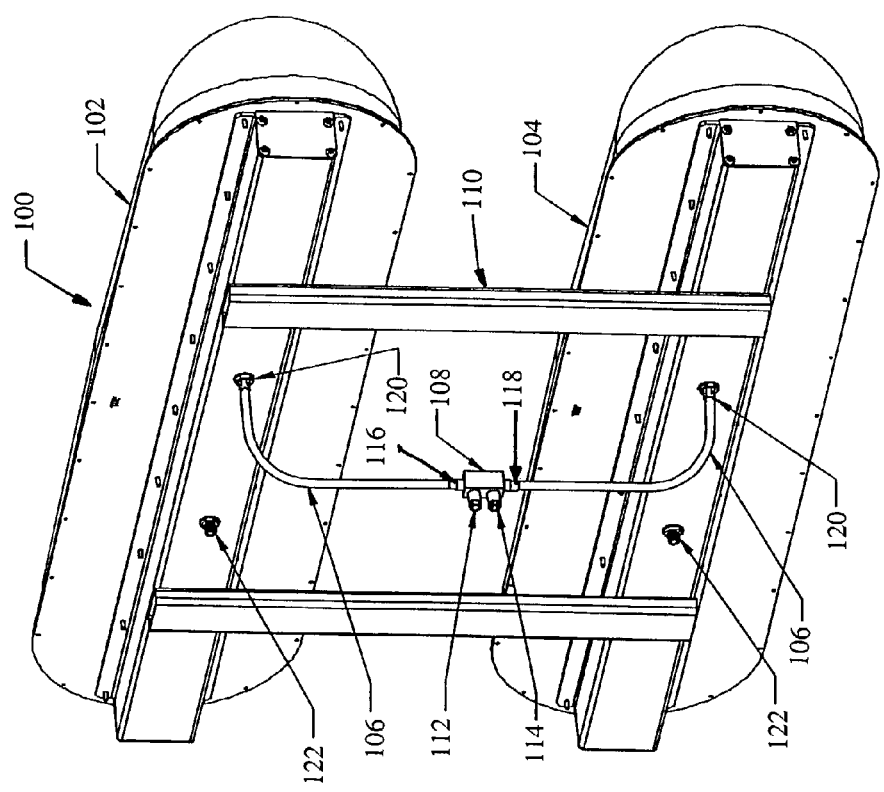
FIG. 1 is a rear view of the dual antenna system according to the present invention.
Figure 2:
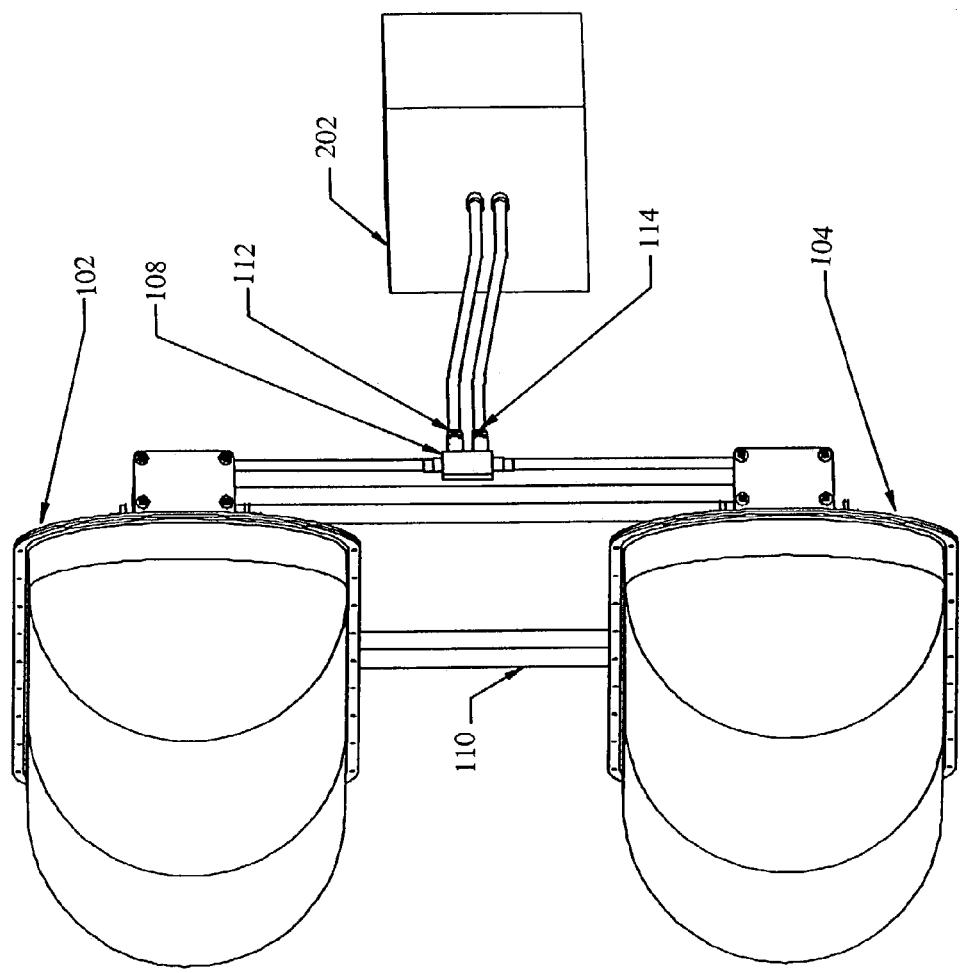
FIG. 2 is a side view of the dual antenna system according to the present invention.

FIGS. 1 and 2 depict antenna system 100 according to an illustrative embodiment of the present invention. Antenna 102 and antenna 104 are coupled to one another by connecting cables 106 and panel combiner 108. Mounting structure 110 is utilized to maintain proper alignment between antennas 102 and 104 and for mounting the dual antenna structure to the tower (not shown). Sum channel 112 and difference channel 114 are provided on panel combiner 108 and are coupled to transceiver 202. Transceiver 202 comprises both a receiver and a transmitter.

In an illustrative embodiment, a 180° hybrid coupler is utilized as panel combiner 108. Panel combiner 108 is a reciprocal four-port device which outputs two equal amplitude in-phase signals from channels 116 and 118 when fed from sum channel 112 and two equal amplitude 180° out of phase signals when fed from difference channel 114.

Conversely, signals input into channels 116 and 118 will add at sum channel 112 and the difference of the two signals will appear at difference channel 114. Thus, if two identical signals are input into channels 116 and 118, they will add and appear at sum channel 112 while no signal will appear at difference channel 114. On the other hand, if the same input signals are 180° out of phase with each other, all of the power will appear at difference channel 114.

Figure 3:
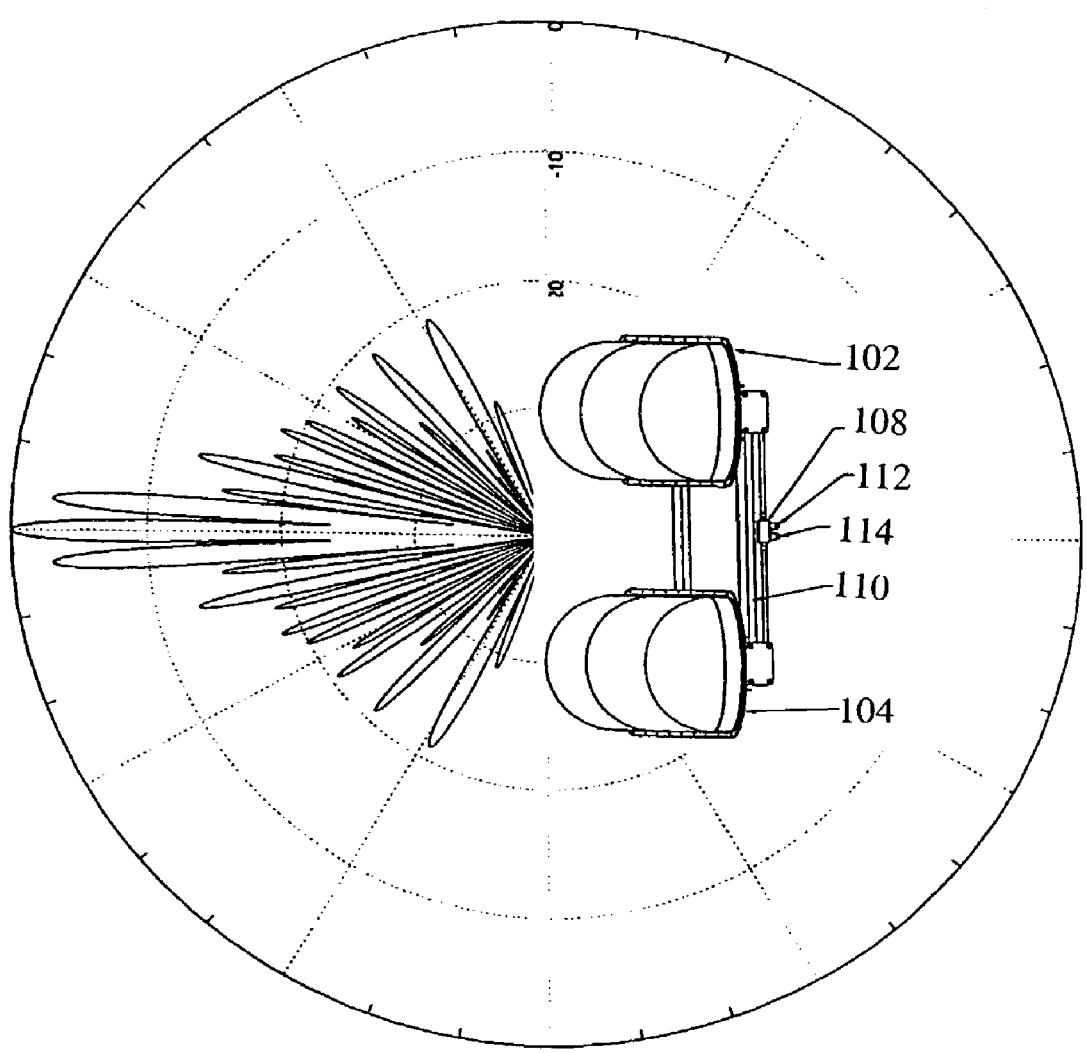
FIG. 3 is a side view illustrating a normalized elevation pattern for the dual antenna system operating via the sum channel.
Figure 4:
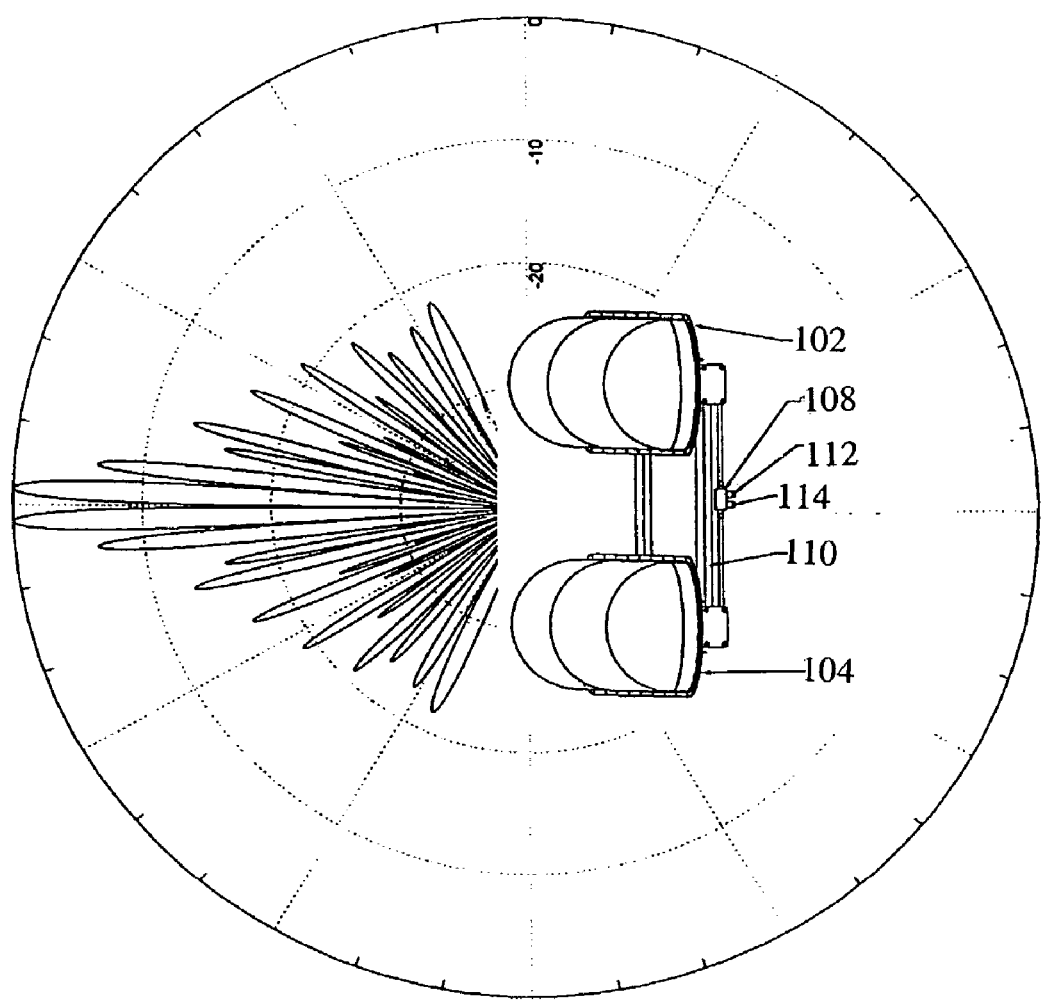
FIG. 4 is a side view illustrating a normalized elevation pattern for the dual antenna system operating via the difference channel.

FIGS. 3 and 4 depict normalized antenna patterns for the angle diversity dual antenna system 100 according to the present invention. Antenna patterns depict the gain of a signal transmitted or received by an antenna. The portion of the pattern showing directions of maximum response (or gain) are called "lobes," and those showing minimum response are called "nulls". An antenna's gain is usually specified as the gain of its main lobe.

Antenna patterns usually take two forms, the elevation pattern and the azimuth pattern. The elevation pattern is a graph of the cross section of the energy radiated from the antenna looking at it from the side. The azimuth pattern is a graph of the cross section of the energy radiated from the antenna as if you were looking at it from directly above the antenna.

Since electromagnetic energy propagates in the form of waves, it spreads out through space due to the phenomenon of diffraction. Individual waves combine both constructively and destructively to form a diffraction pattern that manifests itself in the main lobes and side lobes of the antenna. Nondirectional antennas have equal gain to signals coming to them from all directions. Directional antennas, on the other hand, are more responsive to signals coming from certain directions, and therefore, their gain changes based on direction.

Antennas differ in their sensitivity or response to signals which they receive. A more sensitive antenna is said to have more "gain" because it responds to signals which it intercepts by producing a greater signal output for the receiver than would an antenna with lower gain.

FIG. 3 depicts an elevation pattern when sum channel 112 of panel combiner 108 is used as the active channel. As can be seen in FIG. 3, an elevation pattern having a single main lobe is produced. The single main lobe is produced due to antennas 102 and 104 being fed through sum channel 112 of panel combiner 108. Conversely, as shown in FIG. 4, when difference channel 114 of panel combiner 108 is the active channel, an elevation pattern having two main lobes is produced due to the phase difference of difference channel 114.

In an illustrative embodiment of the present invention, antenna 102 and antenna 104 are flat panel antennas in the general shape of an ellipse, approximately 5'×1' in size, each panel comprising a 32×8 element array. The small size and low profile structure of antennas 102 and 104 reduces wind loading problems that are common with antennas systems utilizing parabolic reflectors.

Flat panel antennas 102 and 104 are quite directional as they have most of their power radiated in one direction in both the vertical and horizontal planes. The elements of each array have the same radiation patterns and polarization properties and are orientated in the same directions in space.

As shown in FIG. 1, antenna 102 and antenna 104 each have a horizontal input 120 and a vertical input 122. Horizontal input 120 and vertical input 122 refer to the polarization of the propagating energy. By providing both horizontal inputs 120 and vertical inputs 122, the polarization for antenna system 100 can be either horizontal or vertical. In an illustrative embodiment, FIG. 1 depicts antenna 102 and antenna 104 connected via horizontal input 120.

By operating antenna system 100 via sum channel 112 of panel combiner 108 while in the transmit mode, along with proper spacing between antennas 102 and 104, a maximum beamwidth of 2.2 degrees to the half-power point in elevation can be achieved. A precise radiating element distribution in antennas 102 and 104 yield the maximum beamwidth of 2.2 degrees to the half-power point in azimuth. The half-power beamwidth is a width measurement of the main lobe. This beamwidth meets FCC Category A requirements without requiring the complex structure associated with antennas having large parabolic reflectors.

Figure 5:
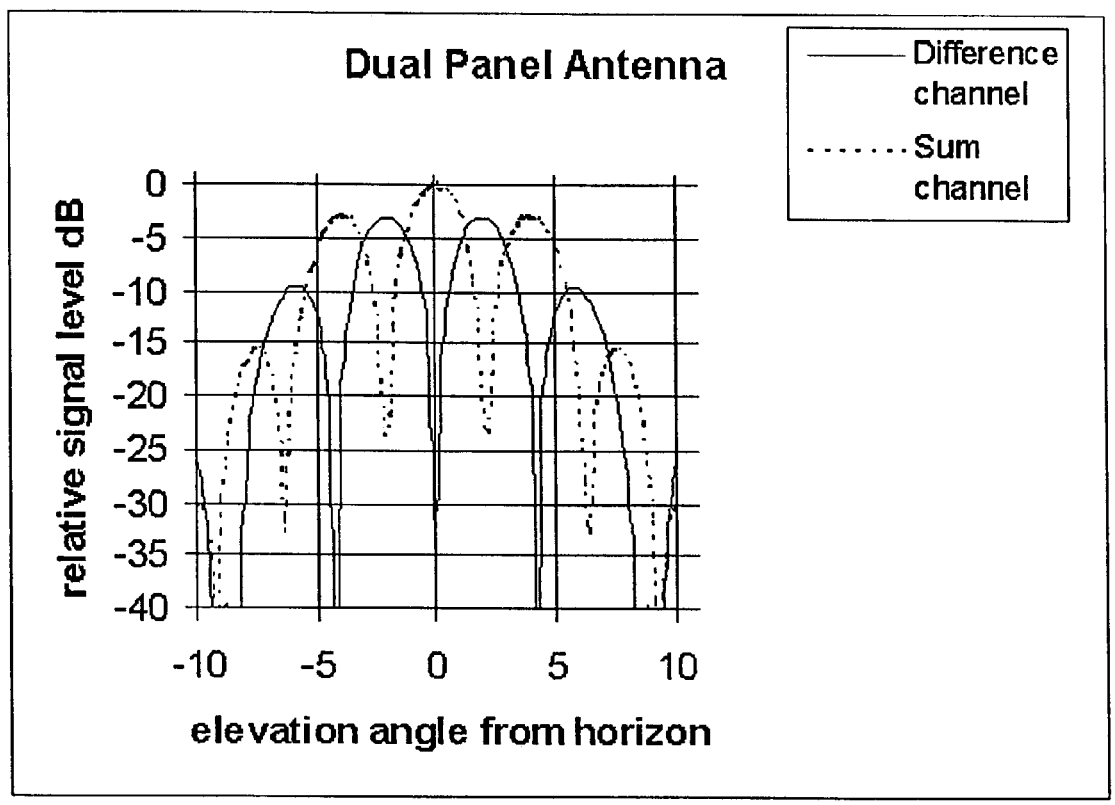
FIG. 5 shows elevation patterns for both the sum channel and difference channel according to the present invention.

As shown in FIG. 5, operating via sum channel 112 produces a higher gain as compared with operating via difference channel 114. Although a minimum amount of gain is necessary for satisfactory reception or transmission, it is not necessarily true that more gain is always better. For example, an antenna pattern that is not concentrated in only one main lobe enables an antenna system to receive signals from a greater number of incoming directions.

Problems associated with signal fading are addressed by enabling antenna system 100 to switch between sum channel 112 and difference channel 114 in a receive mode. By enabling difference channel 114 to be selected in a receive mode, angle diversity is provided due to the elevation pattern having two main lobes as shown in FIG. 4.

During a receive mode, incoming signals may arrive at antennas 102 and 104 from different directions which may be in-phase or out of phase. By utilizing difference channel 114 of panel combiner 108 while in a receive mode, antenna system 100 will be able to receive signals over larger elevation angles.

Incoming signals arriving at antenna 102 and antenna 104 which are completely in-phase will be coupled from antennas 102 and 104 to sum channel 112 of panel combiner 108. Conversely, incoming signals arriving at antenna 102 and 104 which are 180° out of phase will be coupled from antennas 102 and 104 to difference channel 114 of panel combiner 108.

Typically, however, signals will not arrive completely in phase or completely out-of-phase and thus antennas 102 and 104 will couple part of the received signal to sum channel 112 and part of the signal to difference channel 114. By monitoring sum channel 112 and difference channel 114, while in a receive mode, transceiver 202 is able to select the channel which supplies the greatest signal strength.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents.

What is claimed is:

1. An antenna system comprising:
   a first antenna;
   a second antenna disposed above the first antenna in a vertical plane; and
   a combiner coupled to said first antenna and said second antenna that comprises a sum channel,
   wherein said first antenna and said second antenna are separated by a predetermined distance in the vertical plane such that the first antenna and the second antenna operating via said sum channel provide a maximum beamwidth of 2.2 degrees to a half-power point in elevation.

2. The antenna system according to claim 1, wherein a transmit signal is coupled to the sum channel of said combiner during a transmit mode.

3. The antenna system according to claim 2, wherein an elevation pattern having one main lobe is formed when the transmit signal is coupled to the sum channel of said combiner.

4. The antenna system according to claim 2, wherein, during the transmit mode, said combiner outputs a first signal to said first antenna and a second signal to said second antenna, the first signal and the second signal being in-phase with one another,
   wherein the first in-phase signal is output by said first antenna and the second in-phase signal is output by said second antenna, the signals output by said first antenna and said second antenna forming an elevation pattern having one main lobe.

5. The antenna system according to claim 2, wherein said combiner further comprises a difference channel.

6. The antenna system according to claim 5, further comprising a receiver,
   wherein, during a receive mode, said first and second antenna couple received signals to said combiner,
   wherein said receiver selects to receive signals on either the sum channel of said combiner or the difference channel of said combiner, the selection depending on whether the sum channel or the difference channel provides a stronger signal.

7. The antenna system according to claim 6, wherein an elevation pattern having one main lobe is produced if said receiver selects the sun-i channel during the receive mode.

8. The antenna system according to claim 7, wherein an elevation pattern having two main lobes is produced if said receiver selects the difference channel during the receive mode.

9. The antenna system according to claim 6, wherein said first and second antenna operating via the sum channel of said combiner provide a maximum beamwidth of 2.2 degrees to the half-power point in azimuth and elevation.

10. The antenna system according to claim 9, wherein the antenna system is capable of operating in a frequency range from approximately 5.925 GHz to 6.425 GHz.

11. The antenna system according to claim 6, wherein an elevation pattern having two main lobes is produced if said receiver selects the difference channel during the receive mode.

12. The antenna system according to claim 1, wherein said first antenna and said second antenna are flat panel antennas having an identical array of elements.

13. The antenna system according to claim 12, wherein said first and second antennas have a low-profile shape, thereby providing a reduced windload on said first and second antennas.

14. The antenna system according to claim 12, wherein each of said flat panel antennas comprises a 32×8 element array.

15. The antenna system according to claim 1, wherein the maximum beamwidth of 2.2 degrees to the half-power point in elevation is occurs at a frequency range from approximately 5.925 GHz to 6.425 GHz.

* * * * *